US005841256A

United States Patent [19]

Oja et al.

[11] Patent Number: 5,841,256

[45] Date of Patent: Nov. 24, 1998

[54] ARRANGEMENT FOR CONTROLLING THE LOADING ELEMENT OF A CRANE

[75] Inventors: Hannu Oja; Matti Kemppainen, both of Hyvinkää, Finland

[73] Assignee: KCI Konecranes International Corporation, Hyvinkaa, Finland

[21] Appl. No.: 856,799

[22] Filed: May 15, 1997

[30] Foreign Application Priority Data

Jan. 7, 1997 [FI] Finland .................................... 970072

[51] Int. Cl.[6] ............................ B66C 13/40; G05B 11/26

[52] U.S. Cl. ............................................ 318/562; 318/558

[58] Field of Search ................................ 318/3, 558, 727, 318/562; 307/43, 44, 140; 340/825.04, 825.57, 531, 533, 534, 538

[56] References Cited

U.S. PATENT DOCUMENTS 4,465,956 8/1984 Fowler .................................... 318/268
4,507,645 3/1985 Kehl .
4,788,527 11/1988 Johansson .
5,614,811 3/1997 Sagalovich et al. .

*Primary Examiner*—Bentsu Ro

[57] ABSTRACT

The invention relates to an arrangement for controlling a loading element of a crane, the loading element of the crane including an actuator and a current supply cable for supplying current to the loading element. The arrangement for controlling the loading element including a control signal generator/transmitter for generating and transmitting control signals for controlling the actuator of the loading element, a control signal receiver for receiving the control signals in the loading element and a transmission path for transmitting the control signals from the control signal generator/transmitter to the control signal receiver. The transmission path for transmitting the control signals is provided in the current supply cable of the loading element. Furthermore, the control signals may be generated by sending first the control signal and then the current supply in a time-sequential manner, interrupting the power supply for short intervals or controlling the order in which the phases of a multi-phase power supply are delivered.

16 Claims, 1 Drawing Sheet

ARRANGEMENT FOR CONTROLLING THE LOADING ELEMENT OF A CRANE

BACKGROUND OF THE INVENTION

The invention relates to an arrangement for controlling a loading element of a crane, the loading element supported by the crane comprising an actuator, a current supply cable for supplying current to the loading element, and a drum supported by the crane for supplying a necessary length of the current supply cable to the loading element in accordance with the lifting height, the arrangement for controlling the loading element comprising transmission means for generating and transmitting control signals for controlling the actuator of the loading element, reception means for receiving the control signals in the loading element, and a transmission path for transmitting the control signals from the transmission means to the reception means.

The load (burden) of a crane is usually attached by a hook or a loading element specifically designed for the load. For example, different grabs, gripping devices, container-handling devices and lifting beams are used as loading elements, depending on the material handled. The loading elements often also perform one or more additional operations for which they have a separate driving mechanism. Typically such an additional operation is, for example, a turn or tilt of the loading element or opening or closing of the jaws of a grab. The driving mechanism obtains the driving force along a separate current supply cable, which is wound—depending on the lifting height—either on a rope drum of the crane or on a separate cable drum. In both cases the reel or drum on which the cable is stored is provided with a number of slip-ring packets corresponding to the number of conductors in the cable in order to provide a rotating joint surface.

Conventionally, the actuator of a loading element has been controlled either by a separate control cable or by controlling the driving mechanism of the loading element by changing the direction of rotation of the motor. When a separate control cable is used, a separate drum and slip-ring packet are needed for the control cable, and this causes additional costs. A control cable is also liable to damage and failure, and the rate of the separate control cable drum must be adapted to the lifting and dropping rate of the loading element. Further, it is often difficult to find room in a hoist bridge car for the separate control cable drum.

If, on the other hand, the driving mechanism of the loading element is controlled by changing the direction of rotation of the motor, then the fixing points of the motor are subjected to great stress because of the inertial forces. The problem can be alleviated by applying a delay when the direction is changed, but the user, however, often finds this annoying. In any case, here the driving mechanism has to be started basically against the maximum load, which adds to the thermal stress of the motor.

A third alternative is to use a multipole cable which both supplies current to the loading element and controls the actuator of the loading element. A problem here is that the slip-ring packet is even larger, and the multipole cables are also more difficult and more expensive to acquire.

SUMMARY OF THE INVENTION

An object of the present invention is to provide a new type of arrangement for controlling a loading element of a crane, eliminating the problems encountered in the above prior art solutions. The object is achieved by an arrangement according to the invention, which is characterized in that the transmission path for transmitting the control signals is provided by the current supply cable of the loading element. The idea of the invention is thus to integrate the current supply of the loading element and the supply of control signals for controlling the actuator of the loading element into the same conductors of one and the same cable. In practice, this can be effected either by supplying the necessary position control information to the actuator via the current supply cable before the loading element is started or, alternatively, by supplying suitably encoded information to the current supply of the loading element as interruptions in current or voltage supply or as changes in the order of phases. The implementation of the arrangement according to the invention does thus not require a separate slip-ring packet for the control cable, and neither does it require expensive apparatus, e.g. similar to system command control apparatus used in remote drive arrangements of a current supply system, for forwarding control commands as high-frequency signals above the normal supply frequency.

In accordance with the above, a preferred embodiment of the invention is characterized in that control information for the actuator is transmitted through the current supply cable of the loading element before power is switched to the loading element. Since the actuator has two operating positions, control information for selecting the operating position of the actuator preferably comprises a positive or negative voltage pulse giving control information that will be stored in a memory to wait for the starting of the loading element.

If, on the other, control signals are supplied during the operation of the loading element, the control signals of the actuator preferably consist of short-term interruptions in the current supply of the actuator. Since the supply current of the actuator is at least two-phase current, the control signals of the actuator may naturally also consist of short-term interruptions in the phases of the current supply of the actuator. In both the above cases, detection of the control signals is based on the detection of interruptions in the current or voltage supply.

Further, when the supply current of the actuator is at least two-phase current, the control signals of the actuator may preferably be based on the phase order of the current supply of the actuator, and their detection, on the detection of the phase order of the current supply.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention.

In the following the arrangement of the invention will be described in greater detail with reference to FIG. 1, which comprises a figure showing, by way of an example, a schematic view of the general structure of an embodiment of the arrangement according to the invention.

DETAILED DESCRIPTION OF THE PREFERRED EMBODIMENTS

Figure 1:
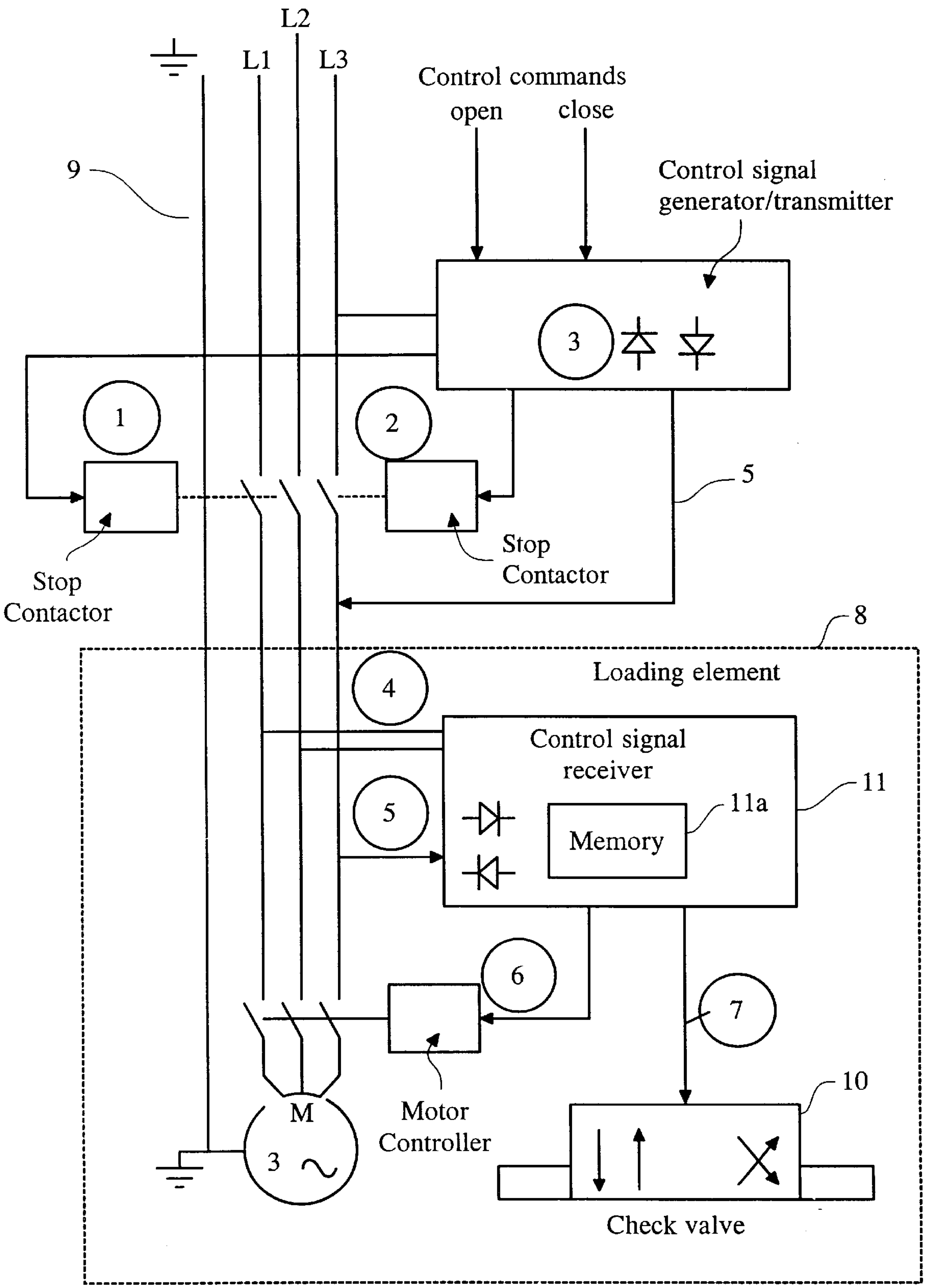

In the arrangement of the figure, a loading element 8 is supplied by a normal four-pole power cable, which comprises an earth conductor and phase conductors L1, L2 and L3. The loading element 8 can be, for example, a grab, in which the motor M rotates continuously to one and the same direction and the operation of the hydraulics of the grab is controlled by an electrically controlled check valve 10. The circuitry shown in the figure further comprises control signal generator/transmitter 3 for generating and transmitting control signals that control the actuator of the loading element, control signal receiver 11 for receiving the control signals in the loading element, a stop contactor 1 for switching phases L1 and L2 on and off under the control of control signal generator/transmitter 3, a stop contactor 2 for switching phase L3 on and off, and a motor control contactor 6 for switching the power of the motor M on and off.

The circuitry shown in the figure operates, briefly, as follows.

When the loading element 8 is to be started, a command 'open' or 'close' is given to the control signal generator/transmitter 3 to generate the commands actually relating to the position of the check valve of the loading element. When the control command is given, the control signal generator/transmitter 3 first switches on phases L1 and L2 by means of contactor 1, whereby voltage is switched to phases L1 and L2 in the loading element 8. The control signal receiver 11 in the loading element 8 then obtains the operating voltage through conductors 4 switched to phase conductors L1 and L2. The control signal generator/transmitter 3 then switches either positive or negative direct voltage to a line 5, which connects to phase L3 of the supply cable of the loading element, depending on whether the actuator of the loading element, i.e. check valve 10, is to be brought to the 'open' or 'close' position.

The control signal receiver means 11 receives the information from the line 5 and stores it in a memory 11A. After this, the control signal is removed and phase L3 is switched to alternating voltage supply by stop of contactor 2. All three phases are then supplied to the loading element 8, and this is detected by the control signal receiver 11 in the loading element, the control signal receiver 11 then switches on the motor M via contactor 6 and simultaneously bringing the check valve 10 to the desired operating position on the basis of the information stored in the memory 11A.

To change the mode of operation of the loading element, contactor 1 and contactor 2 are brought to 'open' position under control of the control signal generator/transmitter 3, whereby the motor M stops and the control of the check valve 10 is removed and the valve returns to an idle position. After this, the same procedure is followed as above, but the control signal is now opposite to the earlier signal, whereby the operating position of the check valve can be changed. In connection with re-starting, stop contactor 1 is again first driven, whereby the loading element obtains control electricity and is ready to receive a new control command.

A drawback of the arrangement described above is that the motor M has to be stopped every time the operating position of the check valve is to be changed. This is not a great problem in the case of a grab, but in connection with some other types of loading elements, it may be somewhat annoying and slows the use of the loading element. For such cases, the arrangement of the invention can be modified such that the control commands are transmitted during the normal operation of the loading element, i.e. when the current supply to the loading element is switched on. This can be effected by providing in the current supply cable of the loading element, naturally before the slip-ring packet, a high-rate contactor or suitable semiconductor switch by which the supply of current through one or more phase conductors can be temporarily interrupted, for example, for a few or a few dozen milliseconds. Detection of control commands transmitted in this manner and possibly encoded in a suitable way can be- based on the detection of interruptions in the supply of current or voltage.

If the supply cable is at least a two-phase cable, the control signals can also be based on the order of phases in the current supply, and their detection can thus be based on the detection of the order of phases in the current supply. If the loading element includes a motor whose direction of rotation is dependent on the order of phases in the current supply, then naturally the phase order cannot be changed unless the new mode of operation requires such a change of direction. The above interruptions in the supply of current and voltage, on the other hand, are of so short duration that they have hardly any effect on the operation of the loading element or the motor therein.

The arrangement according to the invention for controlling a loading element of a crane is described above only by way of some embodiments serving as examples, and it is to be understood that the idea of the invention concerning the transmission of control information through a current supply cable of a loading element can also be applied in ways that differ at least to some extent from the above-described alternatives, and different alternatives can also be combined, without deviating from the scope of the attached claims.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

We claim:

1. An arrangement for controlling a loading element of a crane, the loading element supported by the crane including an actuator, a current supply cable for supplying current to the loading element, and a drum supported by the crane for supplying a necessary length of the current supply cable to the loading element in accordance with the lifting height, the arrangement for controlling the loading element comprising:

transmission means for generating and transmitting control signals for controlling the actuator of the loading element, reception means for receiving the control signals in the loading element, and a transmission path for transmitting the control signals from the transmission means to the reception means, wherein the transmission path for transmitting the control signals is provided by the conductors of current supply cable supplying current to the loading element, wherein the information for controlling the actuator is transmitted through the conductors of the current supply cable of the loading element before power is switched to the loading element.

2. The arrangement according to claim 1, said actuator having two operating positions, wherein the control signal selects the operating position of the actuator and includes a positive or negative voltage pulse, said control signal being stored in a memory to wait for the starting of the loading element.

3. An arrangement for controlling a loading element of a crane, the loading element supported by the crane including an actuator, a current supply cable for supplying current to the loading element, and a drum supported by the crane for supplying a necessary length of the current supply cable to the loading element in accordance with the lifting height, the arrangement for controlling the loading element comprising:

transmission means for generating and transmitting control signals for controlling the actuator of the loading element, reception means for receiving the control signals in the loading element, and a transmission oath for transmitting the control signals from the transmission means to the reception means, wherein the transmission path for transmitting the control signals is provided by the conductors of current supply cable supplying current to the loading element, wherein the control signals of the actuator include short-term interruptions in the current supply of the actuator.

4. The arrangement according to claim 3, wherein the supply current of the actuator has at least two-phases, and the control signals of the actuator including short-term interruptions in the phases of the supply current of the actuator.

5. The arrangement according to claim 3 or 4, wherein the detection of the control signals is based on the detection of interruptions in the current supply.

6. The arrangement according to claim 3 or 4, wherein the detection of the control signals is based on the detection of interruptions in the voltage supply.

7. An arrangement for controlling a loading element of a crane, the loading element supported by the crane including an actuator, a current supply cable for supplying current to the loading element, and a drum supported by the crane for supplying a necessary length of the current supply cable to the loading element in accordance with the lifting height, the arrangement for controlling the loading element comprising:

transmission means for generating and transmitting control signals for controlling the actuator of the loading element, reception means for receiving the control signals in the loading element, and a transmission Path for transmitting the control signals from the transmission means to the reception means, wherein the transmission path for transmitting the control signals is provided by the conductors of current supply cable supplying current to the loading element, wherein the supply current of the actuator has at least two-phases, and the control signals of the actuator are based on the phase order of the current supply of the actuator and the detection thereof is based on the detection of the phase order of the current supply.

8. A control system for controlling a loading element of a crane, comprising:

a current supply cable connected to the loading element;

a control signal generator connected to a control command input, said control signal generator receiving a control command at the control command input and generating a control signal in response thereto;

a control signal transmitter connected to said control signal generator and said current supply cable, said control signal transmitter receiving the control signal from said control signal generator and transmitting the control signal to the loading element over said current supply cable;

a stop contactor connected to said current supply cable and said control signal transmitter, said stop contactor stopping a flow of current to the loading element via said current supply cable;

a control signal receiver connected to said current supply cable, said control signal receiver receiving the control signal over said current supply cable, said control signal receiver controlling an operation of the loading element according to the received control signal, wherein said control signal transmitter transmits the control signal to said control signal receiver before triggering said stop contactor to supply power to the loading element via said current supply cable.

9. The control system according to claim 8, said control signal receiver including a memory, said memory storing the control signal.

10. The control system according to claim 8, further comprising:

a motor connected to said current supply cable and said control signal receiver, said motor being included in the loading element;

a motor controller connected to said control signal receiver and said current supply cable, said motor controller controlling said motor according to the control signal from said control signal receiver; and an actuator connected to said control signal receiver, said actuator controlling an operation of the loading element according to the control signal from said control signal receiver.

11. A control system for controlling a loading element of a crane, comprising:

a current supply cable connected to the loading element;

a control signal generator/transmitter connected to a control command input, said control signal generator/transmitter receiving a control command at the control command input, generating a first control signal in response thereto, and transmitting the first control signal;

a stop contactor connected to said current supply cable and said control signal generator/transmitter, said stop contactor stopping a flow of current to the loading element via said current supply cable;

said stop contactor interrupting current supplied by said current supply cable for short time periods to generate a second control signal in response to receiving the first control signal; and a control signal receiver connected to said current supply cable, said control signal receiver receiving the second control signal over said current supply cable, said control signal receiver controlling an operation of the loading element according to the received second control signal.

12. The control system according to claim 11, said control signal receiver detecting the second control signal based on the detection of interruptions in the current supply.

13. The control system according to claim 11, further comprising:

a motor connected to said current supply cable and said control signal receiver, said motor being included in the loading element;

a motor controller connected to said control signal receiver and said current supply cable, said motor controller controlling said motor according to the control signal from said control signal receiver; and an actuator connected to said control signal receiver, said actuator controlling an operation of the loading element according to the control signal from said control signal receiver.

14. The control system according to claim 11, said control signal receiver detecting the second control signal based on the detection of interruptions in the voltage supply.

15. A control system for controlling a loading element of a crane, comprising:

a current supply cable connected to the loading element and supplying power having at least two phases;

a control signal generator/transmitter connected to a control command input, said control signal generator/transmitter receiving a control command at the control command input, generating a first control signal in response thereto, and transmitting the first control signal;

a stop contactor connected to said current supply cable and said control signal generator/transmitter, said stop contactor stopping a flow of current to the loading element via said current supply cable;

said stop contactor interrupting current supplied by said current supply cable such that a phase order of the current supply is affected to generate a second control signal in response to receiving the first control signal; and a control signal receiver connected to said current supply cable, said control signal receiver receiving the second control signal over said current supply cable, said control signal receiver controlling an operation of the loading element according to the received second control signal.

16. The control system according to claim 15, further comprising:

a motor connected to said current supply cable and said control signal receiver, said motor being included in the loading element;

a motor controller connected to said control signal receiver and said current supply cable, said motor controller controlling said motor according to the control signal from said control signal receiver; and an actuator connected to said control signal receiver, said actuator controlling an operation of the loading element according to the control signal from said control signal receiver.

* * * * *